April 15, 1969 R. ROWE 3,438,818
STORAGE BATTERIES WITH DEFLECTORS AND A GENERAL COVER
Filed Aug. 3, 1966
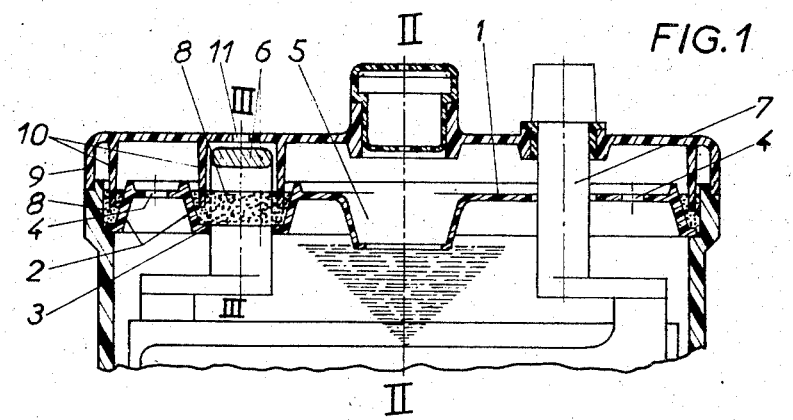
FIG. 1
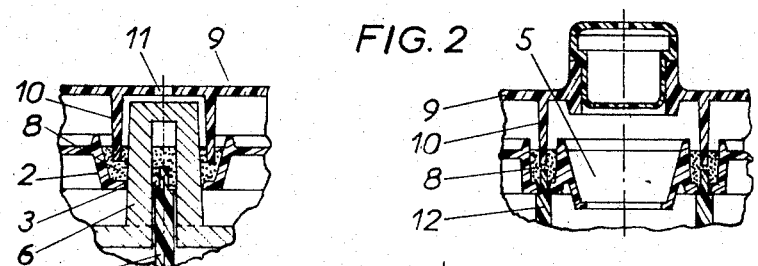
FIG. 2 FIG. 3
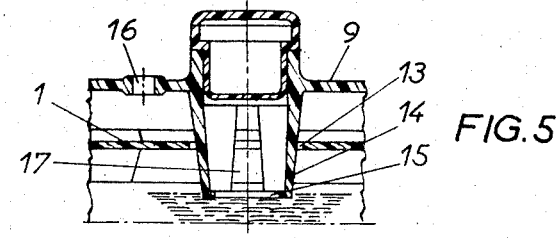
FIG. 5
FIG. 4
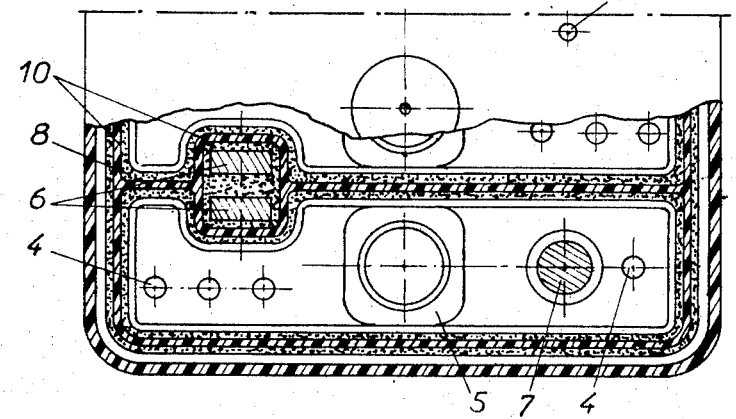

United States Patent Office 3,438,818
Patented Apr. 15, 1969

3,438,818
STORAGE BATTERIES WITH DEFLECTORS
AND A GENERAL COVER
Robert Rowe, Paris, France, assignor to Societe de l'Acumulateur Fulmen, Clichy, Hauts-de-Seine, France, a corporation of France
Filed Aug. 3, 1966, Ser. No. 569,931
Claims priority, application France, Aug. 3, 1965, 27,071
Int. Cl. H01m 1/02, 3/00, 12/10
U.S. Cl. 136—170                        8 Claims

ABSTRACT OF THE DISCLOSURE

A storage battery wherein the battery container partitioned into individual cells is provided with deflectors serving as closures for the cells and being profiled peripherally to form continuous channels with the container walls and the adjacent deflectors surrounding said cells individually and collectively, and a general cover supported in spaced relation to said deflectors on the container walls and having depending ribs forming a continuous skirt projecting into said channel within which is provided a cementing product whereby the container, cover and deflectors are sealed together.

---

The present invention relates to storage batteries. More particularly, the present invention relates to storage batteries having a cover having a sealing skirt extending into a cementing product contained in a groove formed by the periphery of the battery deflectors and container upper edge or partitions.

It is known that storage batteries mounted in a monobloc container comprise a closing device constituted of either element covers comprising filling openings and connection outputs, or a general fixed sealed cover comprising all the filling openings and the connection sites or passageways; the filling openings and the output terminals being on the outside.

It is also known that a battery having element covers can be topped by a general cover covering all of the battery. This general cover can be either a semi-souple cover protecting the upper portion of the battery and the connections between the elements but leaving access to the filling openings and the output terminals or, for motorcycle batteries, a rigid cover comprising stoppers and covering the element covers. The general cover comprises moulded tubes joining the element covers' opening in a water and airtight manner, by a pitch sealing, to form one filling shaft.

It is also well known that between the openings for the evacuation of gas from the electrolysis and the level of the electrolyte, it is frequently necessary to place deflectors to inhibit projections or spattering and, if necessary, to act as a level marker.

An object of the present invention is to provide a sealed battery.

Another object of the present invention is to produce a storage battery where the deflectors are sealed by pitch, or by any suitable mastic, conjunctively with a general cover comprising filling openings and output terminals.

According to the present invention, the deflectors comprise a peripheral portion forming a groove between the walls of the container and its partitions to contain pitch, mastic resin or any other suitable cementing product. Holes are placed in the deflectors for connection members between battery elements. The general cover includes a vertical molded skirt to be embedded into the cementing product during the assembly of the general cover.

The details and embodiments of the invention will be understood by the following description referring to the attached drawing in which:

FIGURE 1 is a transverse section of the upper portion of an end element of a battery with a container according to the present invention;

FIGURE 2 is a partial section along line II—II of FIGURE 1;

FIGURE 3 is a partial section along line III—III of FIGURE 1;

FIGURE 4 is a view from above of a portion of the battery according to FIGURE 1 with a section of the general cover level with the extreme upper edge of the container; and FIGURE 5 is a variant of the central portion of FIGURE 1.

In FIGURE 1, a deflector 1 has a small vertical wall 2 forming a passageway 3 for the connection member coming from the next element. The deflector 1 is perforated at 4 to facilitate gas evacuation and to empty the battery during manufacturing. Also, the deflector 1 may serve as a level marker with a lower molded appendage 5.

During the battery assembly, the groups of plates, with their separators and bars, are placed in the container. The connection member 6 between battery elements are soldered before or after going into the container, according to the chosen process. The bars comprising the posts 7 of the end elements are also soldered. Next, the deflectors 1 are put in place. The middle deflector (if there are three elements) or the four middle deflectors (if there are six elements) each comprise two passageways 3 for connection members 6 between elements. The end deflectors have a single passageway 3 for the corresponding connection member for the next element and a hole with sufficient play for the passage of the post 7 of the end terminal.

The pitch, or cementing product 8, is run into grooves formed by the small walls 2 of the deflectors 1 and the walls or partitions of the container; the pitch intimately surrounds the vertical branches or posts of the connection members 6 and the whole connection member is immersed in a cup constituted by the deflector passageways 3 and the container partition 12. The upper portion of the connection members 6 can remain visible.

While the pitch or other cementing product is still liquid or pasty, the general cover 9 having skirts 10 is placed on the battery.

After the cooling of the pitch or the setting of the cementing product, the whole (container, general cover, etc.) is water and airtight. The interior connection members 6 are completely isolated from the electrolyte by the skirts 10 of the general cover 9 which surround them to form a chamber which communicates with the exterior by an opening 11 for voltage tapping and cooling. The water and airtightness of the output terminals is assured either by a rubber ring, or by soldering a bushing previously put into place during the molding of the general cover 9 or by another suitable method.

FIGURE 2 shows the skirts 10 in the grooves above the partitions 12 of the container on both sides of the filling opening.

FIGURE 3 shows the skirts 10 isolating the connection member 6 and the passageways 3 for accommodating the connection member 6 between the battery elements. The connection member bridge is accessible through the opening 11 in the general cover 9.

FIGURE 4 shows the portion of the skirts 10 embedded in the pitch or the cementing product 8, this illustrates the surrounding of the upper portion of each element and the complete isolation of the connection member 6.

FIGURE 5 represents another embodiment of the present invention. The deflector 1 has no lower appendage 5 as in FIGURE 1; however, it has an opening 13 for a filling chimney 14, which is part of the general cover 9 and whose base acts as a level marker 15. Gases can be evacuated by a hole 16 in the general cover 9 providing for automatic leveling of each battery element. In this case, the stoppers can be completely air and watertight. The evacuation of gas may occur by non-gas-tight stoppers; the vertical chimneys, in this case, comprising one or several vertical holes 17 for filling by sight.

Within the scope of the present invention, the same assembly and closure can be used for batteries where the connection members between battery elements have posts extending through the general cover. The deflectors, in this case, do not have passageways for interior connection members. All the groups of plates do not have vertical posts going through the general cover for the end terminals, as it is described and indicated on the attached drawings. The posts of different polarities are joined by soldered bridges above the general cover or immersed in its upper portion.

The described system for the assembly and closure of storage batteries has the following advantages:

The possibility of sealing a general cover without having to turn the battery upside down during assembly;

The possibility of direct vertical access to the interior connections to tap voltage without previous drilling;

The possibility of using petroleum pitch without the risk of overflow toward the bottom, which can cause leakage or shunting in case of a temperature rise in batteries during service;

The maximum utilization by the electrolyte reserve, of the chamber between the top of the plates and the ceiling of the battery;

The possibility of using all the known filling and gas evacuation devices.

The above embodiments have been shown and described only as examples of the present invention; other modifications and embodiments according to the broad aspects of the invention are contemplated within the spirit and scope of the present invention as defined by the following claims.

I claim:
1. A storage battery comprising
  a battery container having side walls and being provided with partitions dividing the interior of the container into cells for accommodating battery elements,
  a plurality of deflectors each serving as a closure for one of said cells and being arranged to seat in the container on the side walls and partitions thereof, each deflector being peripherally shaped to form a continuous channel with the side walls of the container and the deflectors adjacent thereto surrounding the cells individually and collectively, and
  a general cover including filling openings supported in spaced parallel relationship with said deflectors on the side walls of said container and being provided with depending ribs forming a continuous skirt projecting into each channel formed by said deflectors around each cell,
  said channels being at least partially filled with a cementing product into which said skirts are immersed so that said general cover, said deflectors and said container are sealed together.

2. A battery according to claim 1 wherein a bridging conductor is provided for interconnection of battery elements in adjacent cells, each bridging conductor passing over the associated partition between cells and projecting above said deflectors between said deflectors and said general cover, said deflectors being peripherally shaped to form said channel with and around each bridging conductor.

3. A battery according to claim 2 wherein said skirts on said general cover effectively surround the portion of said bridging conductors projecting above said deflectors and extend into said channel containing said cementing product, whereby said bridging conductors are isolated within an individual chamber.

4. A battery according to claim 2 wherein apertures are provided in the deflectors on the end cells of the container in alignment with apertures in said general cover and terminal posts are provided extending through said aligned apertures, said general cover being provided with additional apertures providing access to said bridging conductors under said general cover.

5. A battery according to claim 2 wherein posts forming part of said bridging conductors extend through said general cover and connecting bridges between said posts are provided above said general cover.

6. A battery according to claim 2 wherein posts forming part of said bridging conductors extend through said general cover and connecting bridges between said posts are embedded in said general cover.

7. A battery according to claim 1 wherein said deflectors include chimneys for filling and control of the level of electrolyte in each cell.

8. A battery according to claim 1 wherein said general cover includes chimneys for filling and control of the level of electrolyte in each cell and said deflectors are provided with apertures for passage of said chimneys.

References Cited

UNITED STATES PATENTS

| | | | |
|---|---|---|---|
| 1,692,316 | 11/1928 | Smith | 136—134 XR |
| 2,186,148 | 1/1940 | Raney | 136—170 |
| 2,629,759 | 2/1953 | Brown et al. | 136—170 |
| 2,637,758 | 5/1953 | Shannon | 136—170 XR |
| 2,981,781 | 4/1961 | Lecullier | 136—170 XR |

FOREIGN PATENTS 1,150,426  1/1958  France.

ALLEN B. CURTIS, *Primary Examiner.*

DONALD L. WALTON, *Assistant Examiner.*

U.S. Cl. X.R.

136—134, 163